(12) United States Patent
Watanabe et al.

(10) Patent No.: US 12,065,242 B2
(45) Date of Patent: Aug. 20, 2024

(54) PASSIVE GUIDANCE MECHANISM AND FLYING OBJECT LANDING SYSTEM

(71) Applicant: TOHOKU UNIVERSITY, Sendai (JP)

(72) Inventors: Masahiro Watanabe, Sendai (JP); Daiki Fujikura, Sendai (JP); Kenjiro Tadakuma, Sendai (JP); Yoshito Okada, Sendai (JP); Kazunori Ohno, Sendai (JP); Satoshi Tadokoro, Sendai (JP)

(73) Assignee: TOHOKU UNIVERSITY, Miyagi (JP)

( * ) Notice: Subject to any disclaimer, the term of this patent is extended or adjusted under 35 U.S.C. 154(b) by 83 days.

(21) Appl. No.: 17/909,298

(22) PCT Filed: Feb. 1, 2021

(86) PCT No.: PCT/JP2021/003523
§ 371 (c)(1),
(2) Date: Sep. 2, 2022

(87) PCT Pub. No.: WO2021/176914
PCT Pub. Date: Sep. 10, 2021

(65) Prior Publication Data
US 2023/0045539 A1     Feb. 9, 2023

(30) Foreign Application Priority Data

Mar. 5, 2020 (JP) ................. 2020-037383

(51) Int. Cl.
*B64C 39/02* (2023.01)
*B64F 1/12* (2006.01)
(Continued)

(52) U.S. Cl.
CPC .............. *B64C 39/024* (2013.01); *B64F 1/12* (2013.01); *B64U 70/95* (2023.01); *B64U 70/97* (2023.01)

(58) Field of Classification Search
CPC ........ B64U 70/30; B64U 70/95; B64U 70/97; B64C 25/68; B64F 1/12
See application file for complete search history.

(56) References Cited

U.S. PATENT DOCUMENTS

| 2013/0082137 | A1 | 4/2013 | Gundlach et al. |
| 2020/0207484 | A1* | 7/2020 | Foggia ..................... B64F 1/125 |
| 2020/0207485 | A1* | 7/2020 | Foggia ..................... B64F 1/36 |

FOREIGN PATENT DOCUMENTS

| CN | 204568057 U | 8/2015 |
| CN | 208161056 U | 11/2018 |

(Continued)

OTHER PUBLICATIONS

Apr. 20, 2021 International Search Report issued in International Patent Application No. PCT/JP2021/003523.

(Continued)

*Primary Examiner* — Richard G Davis
(74) *Attorney, Agent, or Firm* — Oliff PLC

(57) ABSTRACT

A passive guidance mechanism enables smooth guiding to a desired position; and a flying object landing system enables smooth guiding to and landing at a desired position. A pair of guide rails are arranged side by side with a space therebetween, and are provided so that the space increases toward one set of tips of the guide rails. One guide rail is supported so as to be rotatable about a first shaft extending in a direction perpendicular to a plane including the guide rails, at or near the tip of the guide rail. The other guide rail is supported so as to be rotatable about a second shaft extending in a direction perpendicular to the plane including the guide rails, at or near the tip of the guide rail.

9 Claims, 13 Drawing Sheets

(51) Int. Cl.
 B64U 70/95 (2023.01)
 B64U 70/97 (2023.01)

(56) References Cited

FOREIGN PATENT DOCUMENTS

| | | | |
|---|---|---|---|
| JP | 2007-124945 A | 5/2007 | |
| JP | 2014-40186 A | 3/2014 | |
| JP | 2014-144829 A | 8/2014 | |
| JP | 2018-190362 A | 11/2018 | |
| JP | 2019-22098 A | 2/2019 | |
| JP | 2019-89461 A | 6/2019 | |
| WO | 2019/055685 A1 | 3/2019 | |
| WO | WO-2019055685 A1 * | 3/2019 | ............. B64C 39/02 |
| WO | 2019/155854 A1 | 8/2019 | |

OTHER PUBLICATIONS

Sep. 6, 2022 International Preliminary Report on Patentability issued in International Patent Application No. PCT/JP2021/003523.
Jul. 3, 2023 Search Report issued in European Patent Application No. 21764136.4.

* cited by examiner

PASSIVE GUIDANCE MECHANISM AND FLYING OBJECT LANDING SYSTEM

FIELD OF THE INVENTION

The present invention relates to a passive guidance mechanism and a flying object landing system.

DESCRIPTION OF RELATED ART

Conventionally, flying objects such as drones and unmanned aerial vehicles that can be flown by remote control or automatic control generally take off and land on a flat surface such as a dedicated landing platform, the ground, the upper surface of a vehicle, or the roof of a building (see, for example, Patent Literature 1 or 2).

CITATION LIST

Patent Literature

Patent Literature 1: JP-A-2019-089461
Patent Literature 2: JP-A-2018-190362

SUMMARY OF THE INVENTION

However, in a general flying object that takes off and lands on a flat surface as described in Patent Literatures 1 and 2, it is necessary to reduce the thrust of a propeller or the like when landing, so that it is difficult to deal with disturbances and there is also the problem of the ground effect. Therefore, there is a problem that the control tends to be unstable and it is difficult to quickly guide the flying object to a desired position and land the flying object.

The present invention has been made in view of such a problem, and an object thereof is to provide a passive guidance mechanism that enables smooth guiding to a desired position; and a flying object landing system that enables smooth guiding to and landing at a desired position.

In order to achieve the above object, a passive guidance mechanism according to the present invention includes a pair of guide rails arranged side by side with a space therebetween and provided so that the space increases toward one set of tips of the guide rails, wherein one guide rail is supported so as to be rotatable about a first shaft extending in a direction perpendicular to a plane including the guide rails, at or near the tip thereof, and the other guide rail is supported so as to be rotatable about a second shaft extending in a direction perpendicular to the plane including the guide rails, at or near the tip thereof.

In the passive guidance mechanism according to the present invention, when a guiding target object collides with the inside of one guide rail when the guiding target object enters between the guide rails from sides of one set of tips of the guide rails, since one guide rail rotates toward the outer side around the first shaft, the angle between the traveling direction of the guiding target object and one guide rail can be reduced. Further, when the guiding target object collides with the inside of the other guide rail, since the other guide rail rotates toward the outer side around the second shaft, the angle between the traveling direction of the guiding target object and the other guide rail can be reduced. As a result, even if the guiding target object collides with each of the guide rails, the guiding target object can easily enter from sides of one set of tips of the guide rails toward the sides of the other set of tips without being bounced back to the side opposite to the entering direction. In this way, the passive guidance mechanism according to the present invention can smoothly guide the guiding target object to a desired position on the sides of the other set of tips of the guide rails.

In the passive guidance mechanism according to the present invention, since the guide rails are provided so that the space between the guide rails increases toward one set of tips, the guiding target object can easily enter between the guide rails from sides of one set of tips of the guide rails. The guide rails may have any shape as long as the space between the guide rails increases toward one set of tips of the guide rails. The guide rails may have a linear shape so that one set of tips of the guide rails form a smooth curve and the other set of tips are parallel to each other. One set of tips may have a linear shape and the entire guide rail may have a linear shape. The guide rails may be arranged at intervals in the vertical direction, or may be arranged at intervals in the horizontal direction.

The passive guidance mechanism according to the present invention may be configured to guide a moving object to a desired position, or may be configured to move itself and guide a stationary object to a desired position. The passive guidance mechanism according to the present invention can be used, for example, as a guidance mechanism for landing a flying object at a desired position, a robot arm or a gripper for capturing and gripping an object.

In the passive guidance mechanism according to the present invention, it is preferable that the one guide rail and the other guide rail are provided so as to be rotatable in a forward direction and a reverse direction in a range of predetermined rotation angles about the first shaft and the second shaft, respectively, from an initial position where the guide rails are arranged symmetrically with respect to a predetermined plane. In this case, the range of rotation angles of the first shaft and the second shaft can limit the range of movement of the other set of tips of the guide rails, and the guide range can be limited to a desired range.

In the passive guidance mechanism according to the present invention, it is preferable that the guide rails are configured to be urged toward the initial position. In this case, the rotationally moved guide rails can always be returned to the initial position. Therefore, the guiding target object can be moved to an intermediate position of each of the guide rails at the initial position, and the guide range can be narrowed.

The passive guidance mechanism according to the present invention may include a damper for absorbing a rotational force of the one guide rail and the rotational force of the other guide rail when the one guide rail rotates from the initial position to a side opposite to the other guide rail and when the other guide rail rotates from the initial position to a side opposite to the one guide rail. In this case, the damper can absorb the impact of the guiding target object that collides with the guide rails, and can prevent damage to the guide rails and the guiding target object. Further, it is possible to absorb the energy in the collision direction of the guiding target object and suppress the bounce, so that the guiding target object can easily enter from the sides of one set of tips of the guide rails toward the sides of the other set of tips.

In the passive guidance mechanism according to the present invention, it is preferable that the guide rails are connected to each other so that the rotation angle of the one guide rail about the first shaft from the initial position is equal to the rotation angle of the other guide rail about the second shaft from the initial position. In this case, when the guiding target object collides with one guide rail, one guide rail rotates toward the outer side and the other guide rail rotates toward the inner side, so that the guiding target object colliding with one guide rail can immediately collide with the other guide rail side and the guide rails can rotate toward the opposite sides. Similarly, when the guiding target object collides with the other guide rail, the other guide rail rotates toward the outer side and one guide rail rotates toward the inner side, so that the guiding target object colliding with the other guide rail can immediately collide with one guide rail side and the guide rails can rotate toward the opposite sides. As a result, the guiding target object can be gradually moved to an intermediate position of each of the guide rails at the initial position while colliding with the guide rails, and the guide range can be narrowed.

In the passive guidance mechanism according to the present invention, it is preferable that it includes a connecting member that connects the one guide rail and the other guide rail, the connecting member has one end connected the one guide rail so as to be rotatable about a third shaft perpendicular to the plane including the guide rails and has the other end connected to the other guide rail so as to be rotatable about a fourth shaft perpendicular to the plane including the guide rails, and the first shaft, the second shaft, the third shaft, and the fourth shaft form a four-node link mechanism composed of rotating pairs, and a line connecting the third shaft and the fourth shaft has the same length as and moves in parallel to a line connecting the first shaft and the second shaft. Also in this case, the guiding target object can be gradually moved to an intermediate position of each of the guide rails at the initial position while colliding with the guide rails, and the guide range can be narrowed.

In the passive guidance mechanism according to the present invention, it is preferable that the connecting member is arranged at a predetermined distance in a vertical direction from the plane including the guide rails. In this case, it is possible to prevent the guiding target object passing between the guide rails from hitting the connecting member.

The passive guidance mechanism according to the present invention preferably has a connection support member that supports the connecting member so as to be movable in relation to the guide rails. In this case, the guide rails and the connecting member can be stably rotated or moved.

A flying object landing system according to the present invention includes the passive guidance mechanism according to the present invention; a flying object having a suspension portion provided on an upper part so as to be inserted between the guide rails from sides of the one set of tips of the guide rails; and a landing means arranged on the sides of the other set of tips of the guide rails and provided so as to be able to land the flying object guided from sides of the one set of tips of the guide rails to the sides of the other set of tips through the suspension portion between the guide rails.

The flying object landing system according to the present invention can land a flying object as follows. That is, the flying object is made to fly from the sides of one set of tips of the guide rails toward the lower sides of the guide rails, and the suspension portion provided on the upper part of the flying object is inserted between the guide rails from the sides of one set of tips of the guide rails. At this time, the passive guidance mechanism can smoothly guide the flying object to the sides of the other set of tips of the guide rails, and the flying object can be landed by the landing means.

In the flying object landing system according to the present invention, the influence of the ground effect can be made almost negligible by arranging the guide rails so that a sufficient space is provided under the flying object. In addition, since there is almost no influence of the ground effect, the flying object can land stably even in a relatively narrow space. In the flying object landing system according to the present invention, the guide rails may be installed in any place as long as a space can be provided at least on the lower side and in the extension direction on one end side. The guide rails may be installed on the ceiling or under the eaves of a factory, a house, a building, or the like, or may be suspended by a crane or the like.

In the flying object landing system according to the present invention, it is preferable that the landing means has a pair of landing rails, and is configured so that the suspension portion of the flying object guided to the sides of the other set of tips of the guide rails is guided between the landing rails and the flying object can be suspended at a predetermined position of the landing rails with the suspension portion inserted between the landing rails.

When the landing rails are provided, by inserting the suspension portion between the landing rails, the flying object can be easily moved to the landing position along the landing rails by only the urging force of the flying object at the time of insertion, or by applying force from the sides of one set of ends of the landing rails toward the sides of the other set of ends to the flying object. Therefore, after the suspension portion is inserted between the landing rails, fine flight control is not required, and in some cases, it is possible to stop the propulsion means such as the propeller of the flying object.

In this case, the landing position of the landing rails may be a predetermined point, or may be a predetermined length range along the length direction of the landing rails. The flying object does not necessarily have to stop at the landing position. In this case, for example, the flying object landing system can be suitably used when carrying luggage or the like attached to the lower part of the flying object. When the flying object is suspended at the landing position, since there is a space under the flying object, it is easy to attach luggage to the lower part of the flying object and to unload the luggage attached to the lower part of the flying object. At this time, for example, by installing a belt conveyor under the flying object suspended at the landing position, the luggage being unloaded from the flying objects coming one after another can be conveyed by the belt conveyor, and the luggage being conveyed by the belt conveyor can be sequentially attached to the lower part of the flying object and transported individually.

According to the present invention, it is possible to provide a passive guidance mechanism that enables smooth guiding to a desired position; and a flying object landing system that enables smooth guiding to and landing at a desired position.

DETAILED DESCRIPTION OF THE INVENTION

Figure 1:
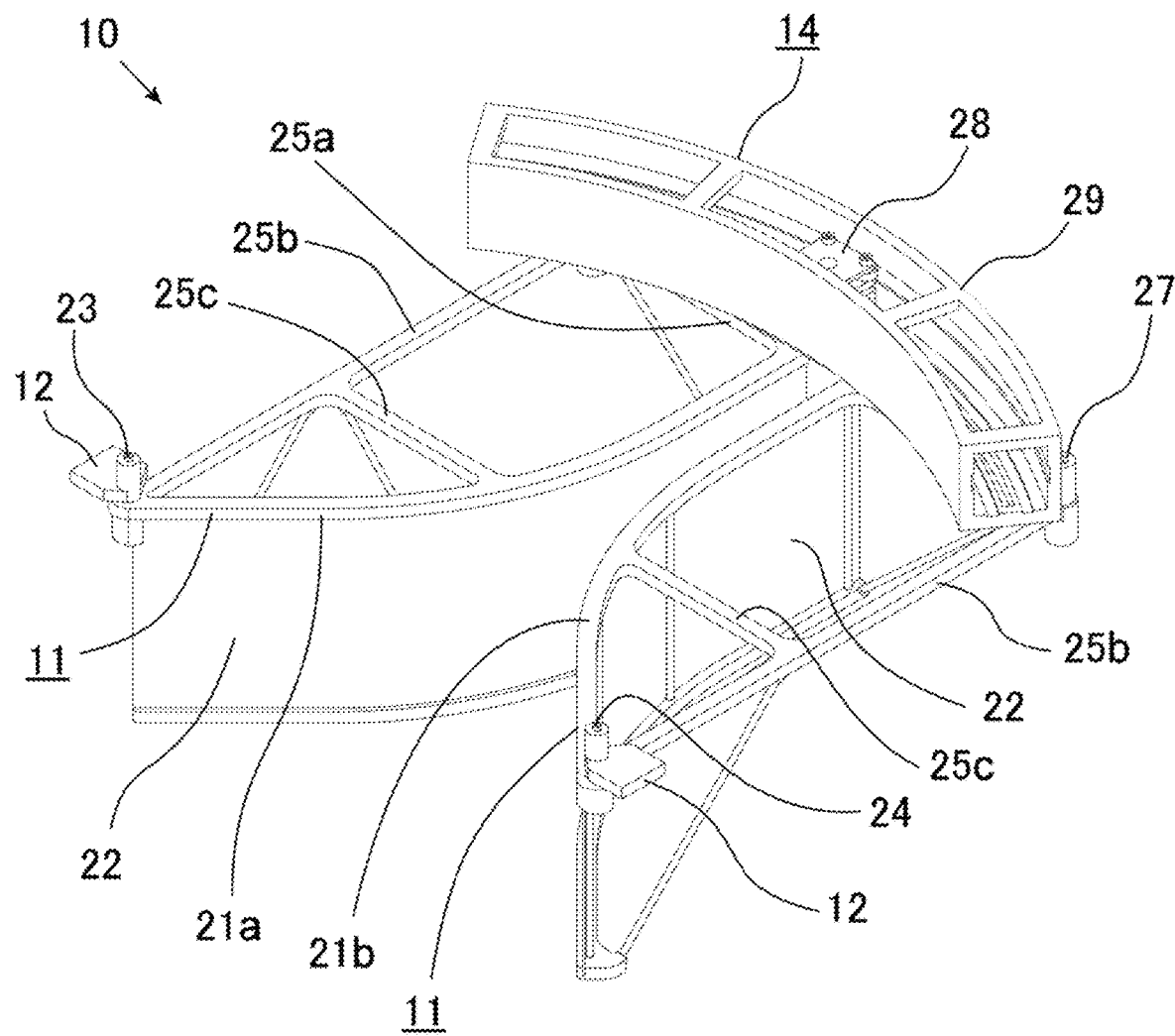
FIG. 1 is a perspective view showing a passive guidance mechanism according to an embodiment of the present invention.
Figure 2:
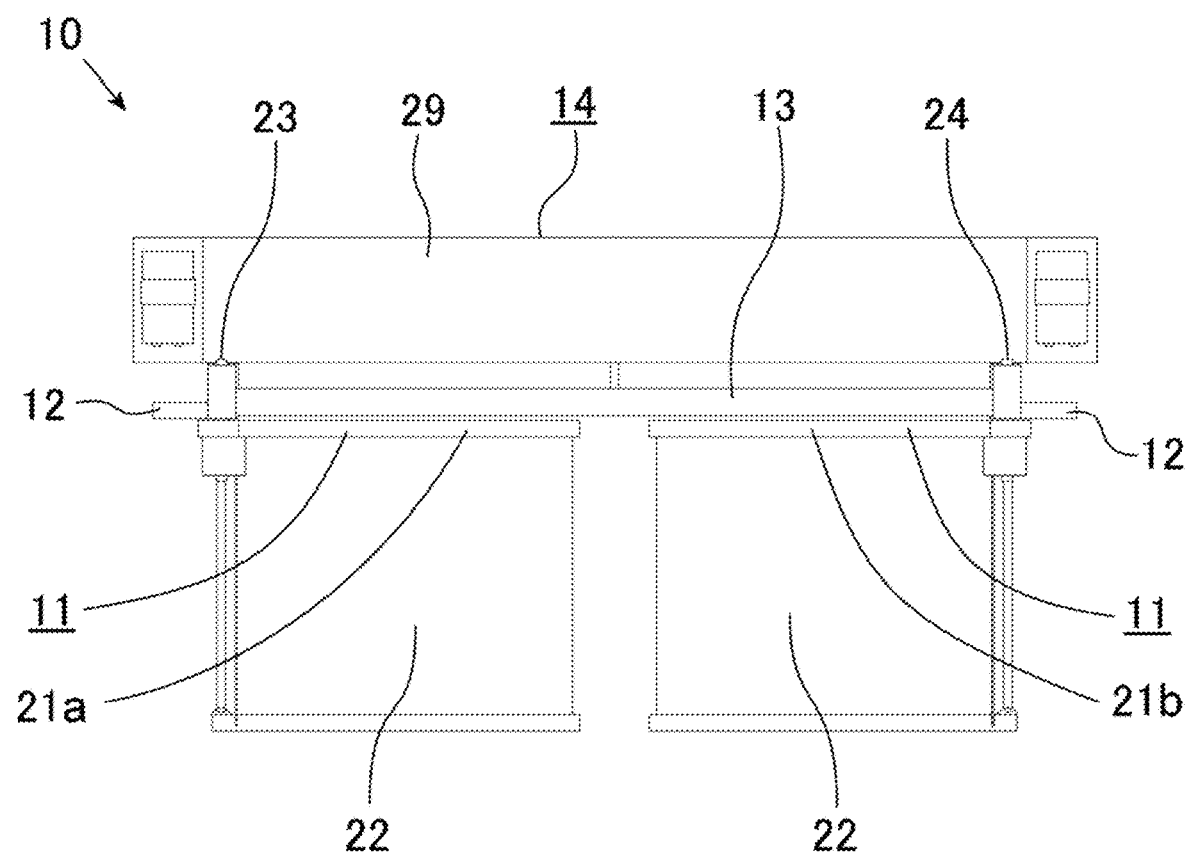
FIG. 2 is a front view showing the passive guidance mechanism according to the embodiment of the present invention.
Figure 3:
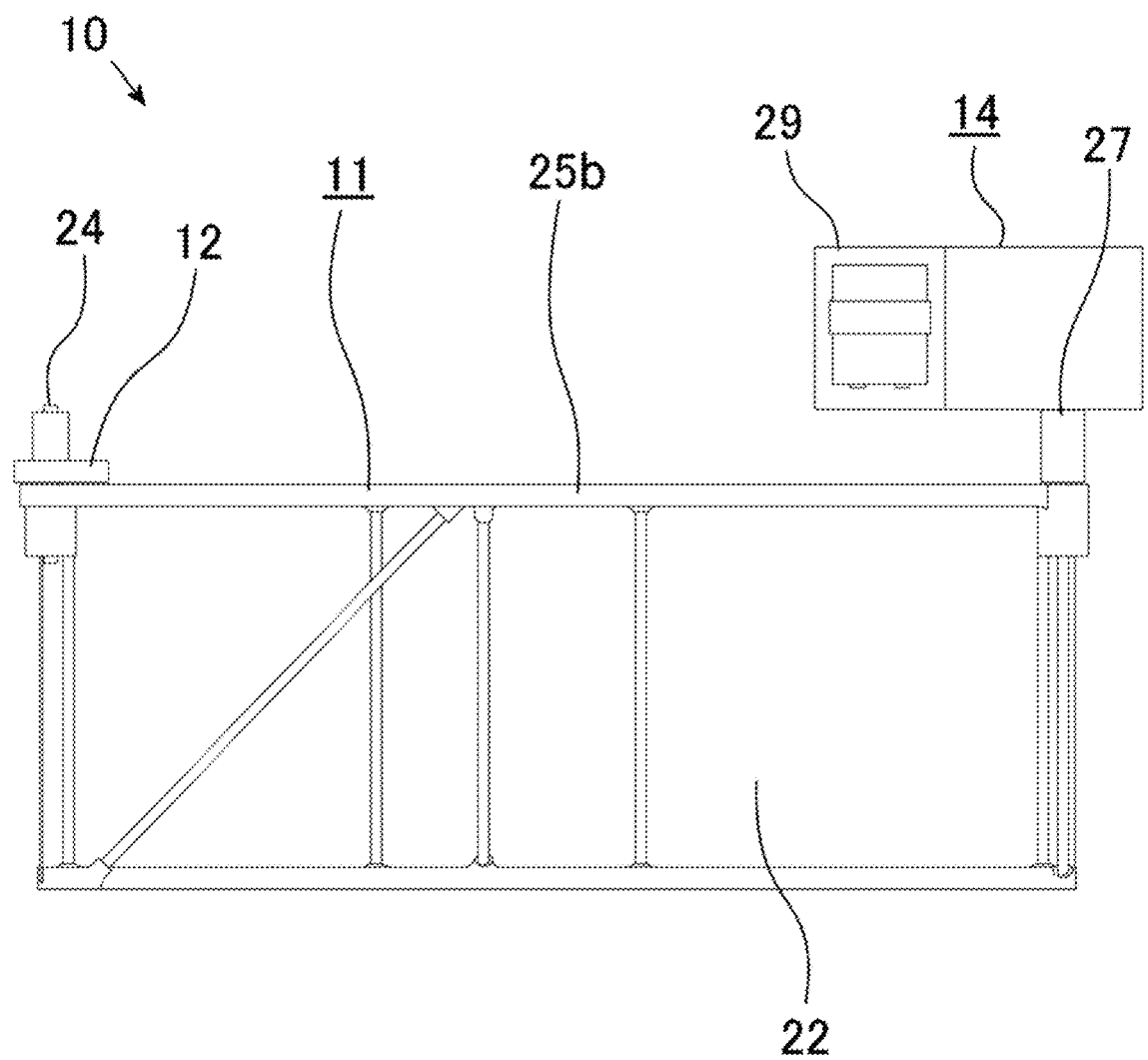
FIG. 3 is a right side view showing the passive guidance mechanism according to the embodiment of the present invention.

Hereinafter, embodiments of the present invention will be described with reference to the drawings.

FIGS. 1 to 6 show a passive guidance mechanism according to an embodiment of the present invention.

As shown in FIGS. 1 to 6, a passive guidance mechanism 10 has a pair of rail members 11, a rail support member 12, a connecting member 13, and a connecting support member 14.

The pair of rail members 11 has a pair of guide rails 21a and 21b arranged side by side with a space therebetween and provided so that the space increases toward one set of tips of the guide rails. The guide rails 21a and 21b are formed in a linear shape so that one set of tips thereof form a curve so as to open toward the outer side and the other set of tips are parallel to each other. The guide rails 21a and 21b may have any shape as long as the space increases toward one set of tips thereof. For example, one set of tips may have a linear shape and the entire guide rails 21a and 21b may have a linear shape. The guide rails 21a and 21b may be arranged at intervals in the vertical direction, or may be arranged at intervals in the horizontal direction.

Each rail member 11 has a surface member 22 extending in a direction perpendicular to a plane including the guide rails 21a and 21b so as to have a predetermined width in the perpendicular direction. Further, one rail member 11 is provided so as to be rotatable about a first shaft 23 extending in the direction perpendicular to the plane including the guide rails 21a and 21b at one tip of the guide rail 21a. The other rail member 11 is provided so as to be rotatable about a second shaft 24 extending in the direction perpendicular to the plane including the guide rails 21a and 21b at one tip of the guide rail 21b. One guide rail 21a and the other guide rail 21b are provided so as to be rotatable in the forward and reverse directions from an initial position where the guide rails 21a and 21b are arranged symmetrically with respect to the plane perpendicular to the plane including the guide rails 21a and 21b.

Each rail member 11 has a first reinforcing portion 25a extending vertically toward the outer side from the other set of tips of the guide rails 21a and 21b, a second reinforcing portion 25b extending from one set of tips to the first reinforcing portion 25a in parallel to the other set of linear tips, and a third reinforcing portion 25c extending parallel to the first reinforcing portion 25a from the vicinity of the center of the second reinforcing portion 25b toward the guide rails 21a and 21b. In addition, each rail member 11 also has a reinforcing member for reinforcing the surface member 22 and the like.

Figure 6:
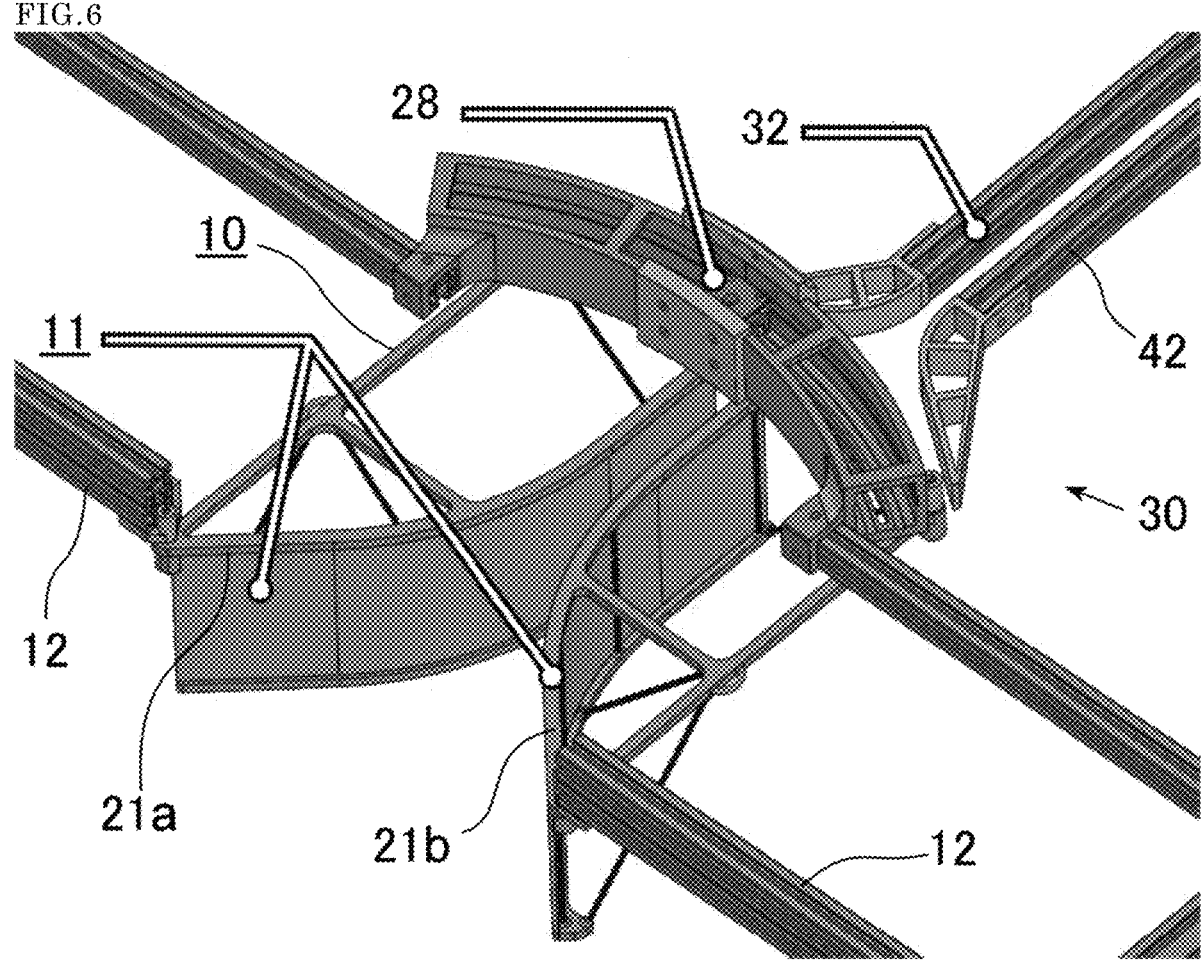
FIG. 6 is a perspective view showing a passive guidance mechanism and a flying object landing system according to an embodiment of the present invention.

As shown in FIG. 6, the rail support member 12 is provided so as to extend toward the outer side from one set of tips of the guide rails 21a and 21b so as to rotatably support one set of tips of the guide rails 21a and 21b. The rail support member 12 supports the guide rails 21a and 21b so that the positions of one set of tips of the guide rails 21a and 21b do not move even when the guide rails 21a and 21b rotate.

As shown in FIGS. 1 to 6, the connecting member 13 has a linear shape, and connects the connection position between the first reinforcing portion 25a and the second reinforcing portion 25b of one rail member 11 and the connection position between the first reinforcing portion 25a and the second reinforcing portion 25b of the other rail member 11. The connecting member 13 has one end connected to one guide rail 21a via the first reinforcing portion 25a and the second reinforcing portion 25b so as to be rotatable about a third shaft 26 perpendicular to the plane including the guide rails 21a and 21b. The connecting member 13 has the other end connected to the other guide rail 21b via the first reinforcing portion 25a and the second reinforcing portion 25b so as to be rotatable about a fourth shaft 27 perpendicular to the plane including the guide rails 21a and 21b. The connecting member 13 is arranged at a predetermined distance from the guide rails 21a and 21b on the side opposite to the surface member 22 in a direction perpendicular to the plane including the guide rails 21a and 21b.

The connecting support member 14 is provided on the side of the connecting member 13 opposite to the guide rails 21a and 21b so as to movably support the connecting member 13 with respect to the guide rails 21a and 21b. The connecting support member 14 has a slide member 28 attached to the central portion of the connecting member 13, and an arc-shaped support portion 29 provided so as to allow the slide member 28 to slide. The arc-shaped support portion 29 is provided along the trajectory of the slide member 28 when the connecting member 13 moves with the rotation of the guide rails 21a and 21b. As a result, the connecting support member 14 is configured so that the slide member 28 slides smoothly. The connecting support member 14 is fixed to the rail supporting member 12 and supports the connecting member 13.

Figure 4:
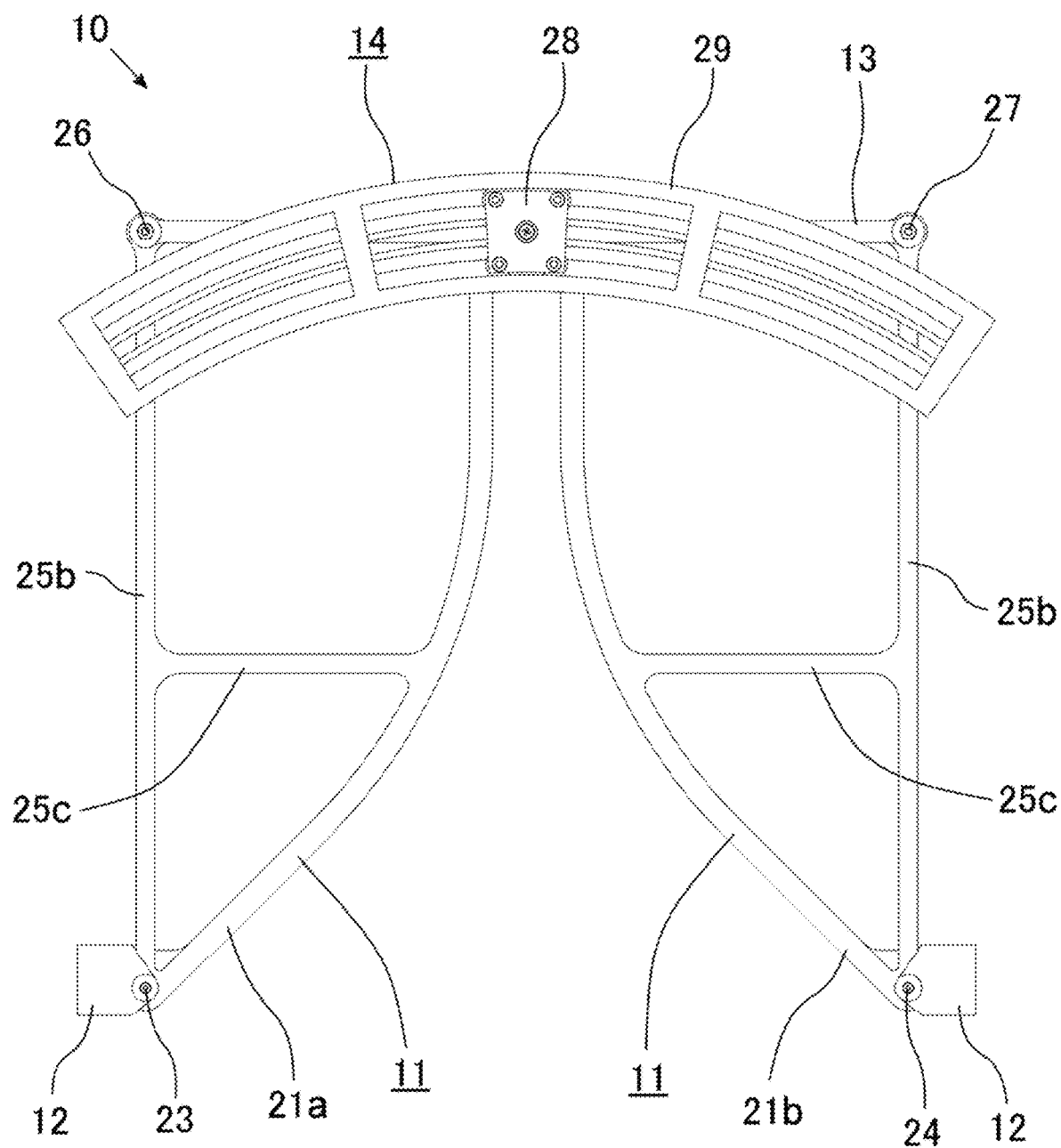
FIG. 4 is a plan view showing the passive guidance mechanism according to the embodiment of the present invention.
Figure 5:
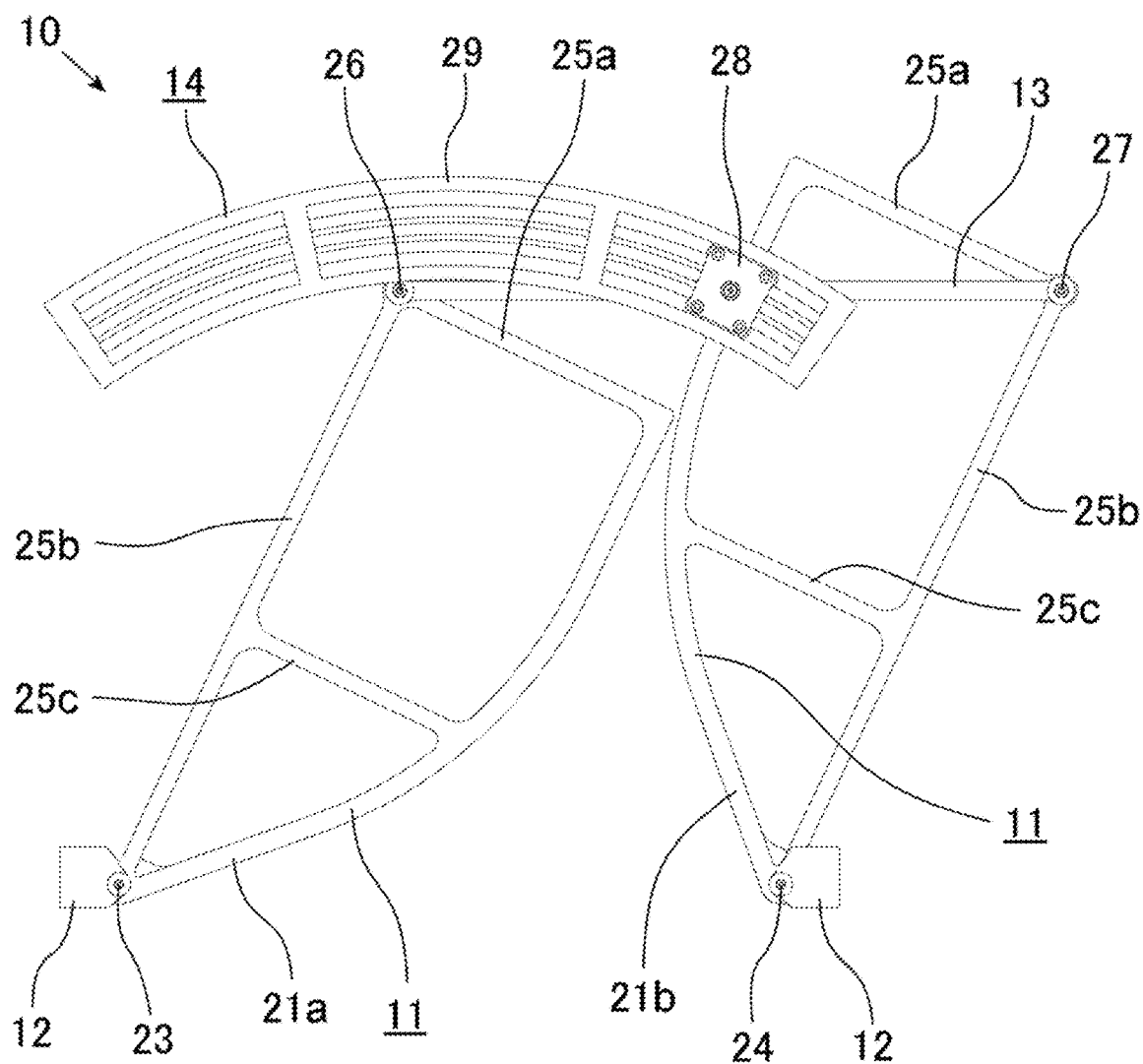
FIG. 5 is a plan view showing a state in which guide rails of the passive guidance mechanism according to the embodiment of the present invention are rotated.

As shown in FIGS. 4 and 5, in the passive guidance mechanism 10, the first shaft 23, the second shaft 24, the third shaft 26, and the fourth shaft 27 forms a four-node link mechanism composed of rotating pairs. In the passive guidance mechanism 10, the line connecting the third shaft 26 and the fourth shaft 27 has the same length as and moves in parallel to the line connecting the first shaft 23 and the second shaft 24. The passive guidance mechanism 10 is configured so that the rotation angle of one guide rail 21a about the first shaft 23 from the initial position is equal to the rotation angle of the other guide rail 21b about the second shaft 24 from the initial position.

In the passive guidance mechanism 10, the rotation range of the guide rails 21a and 21b is defined by the range until the guide rails 21a and 21b collide with each other when they rotate and the slide range of the slide member 28 on the arc-shaped support portion 29. As a result, the guide rails 21a and 21b can rotate in the forward direction and the reverse direction about the first shaft 23 and the second shaft 24, respectively, within the defined range of the rotation angles from the initial position.

Next, the effects will be described.

In the passive guidance mechanism 10, when a guiding target object collides with the inside of one guide rail 21a when the guiding target object enters between the guide rails 21a and 21b from the sides of one set of tips of the guide rails 21a and 21b, since one guide rail 21a rotates toward the outer side around the first shaft 23, the angle between the traveling direction of the guiding target object and one guide rail 21a can be reduced. Further, when the guiding target object collides with the inside of the other guide rail 21b, since the other guide rail 21b rotates toward the outer side around the second shaft 24, the angle between the traveling direction of the guiding target object and the other guide rail 21b can be reduced. As a result, even if the guiding target object collides with each of the guide rails 21a and 21b, the guiding target object can easily enter from the sides of one set of tips of the guide rails 21a and 21b toward the sides of the other set of tips without being bounced back to the side opposite to the entering direction.

In the passive guidance mechanism 10, when the guiding target object collides with one guide rail 21a, one guide rail 21a rotates toward the outer side and the other guide rail 21b rotates toward the inner side, so that the guiding target object colliding with one guide rail 21a can immediately collide with the other guide rail 21b side and the guide rails 21a and 21b can rotate toward the opposite sides. Similarly, when the guiding target object collides with the other guide rail 21b, the other guide rail 21b rotates toward the outer side and one guide rail 21a rotates toward the inner side, so that the guiding target object colliding with the other guide rail 21b can immediately collide with one guide rail 21a side and the guide rails 21a and 21b can rotate toward the opposite sides. As a result, the guiding target object can be gradually moved to an intermediate position of each of the guide rails 21a and 21b at the initial position while colliding with the guide rails 21a and 21b, and the guide range can be narrowed. In this way, the passive guidance mechanism 10 can smoothly guide the guiding target object to a desired position on the sides of the other set of tips of the guide rails 21a and 21b.

In the passive guidance mechanism 10, since the guide rails 21a and 21b are provided so that the space between the guide rails 21a and 21b increases toward one set of tips, the guiding target object can easily enter between the guide rails 21a and 21b from the sides of one set of tips of the guide rails 21a and 21b. Since the connecting member 13 is arranged at a predetermined distance from the guide rails 21a and 21b, the guiding target object passing between the guide rails 21a and 21b can be prevented from hitting the connecting member 13. Due to the rail support member 12 and the connection support member 14, the guide rails 21a and 21b and the connecting member 13 can be stably rotated and moved.

The passive guidance mechanism 10 may be configured to guide a moving object to a desired position, or may be configured to move itself and guide a stationary object to a desired position. The passive guidance mechanism 10 can be used, for example, as a guidance mechanism for landing a flying object at a desired position, a robot arm or a gripper for capturing and gripping an object.

The passive guidance mechanism 10 may be configured so that the guide rails 21a and 21b are urged toward the initial position. In this case, the rotationally moved guide rails 21a and 21b can always be returned to the initial position. Therefore, the guiding target object can be moved to an intermediate position of each of the guide rails 21a and 21b at the initial position, and the guide range can be narrowed.

The passive guidance mechanism 10 may include a damper for absorbing a rotational force of the one guide rail 21a and the rotational force of the other guide rail 21b when the one guide rail 21a rotates from the initial position to a side opposite to the other guide rail 21b and when the other guide rail 21b rotates from the initial position to a side opposite to the one guide rail 21a. In this case, the damper can absorb the impact of the guiding target object that collides with the guide rails 21a and 21b, and can prevent damage to the guide rails 21a and 21b and the guiding target object. Further, it is possible to absorb the energy in the collision direction of the guiding target object and suppress the bounce, so that the guiding target object can easily enter from the sides of one set of tips of the guide rails 21a and 21b toward the sides of the other set of tips.

FIGS. 6 to 13 show a flying object landing system according to an embodiment of the present invention.

As shown in FIGS. 6 to 9, a flying object landing system 30 includes a flying object 31, the passive guidance mechanism 10, and a landing means 32.

The flying object body 31 has a suspension portion 41 provided at the upper part so as to extend upward. The suspension portion 41 has an arm 41a provided so as to extend upward from the flying object 31 and an engagement portion 41b provided at the tip of the arm 41a. The engagement portion 41b has a shape that it is elongated along the traveling direction of the flying object 31, and the tip in the traveling direction is sharp. In a specific example, the flying object 31 is a drone, but may be any flyable object such as an aerial vehicle. The flying object 31 may be able to fly by remote control or may be able to fly by automatic control.

The passive guidance mechanism 10 is provided so that the suspension portion 41 of the flying object 31 can be inserted between the guide rails 21a and 21b from the sides of one set of tips of the guide rails 21a and 21b. The passive guidance mechanism 10 is provided so that the flying object 31 having the suspension portion 41 inserted between the guide rails 21a and 21b is guided from the sides of one set of tips of the guide rails 21a and 21b to the sides of the other set of tips.

As shown in FIG. 6, the landing means 32 has a pair of landing rails 42. The landing rails 42 are arranged side by side with a space between the guide rails 21a and 21b at the sides of the other set of tips of the guide rails 21a and 21b so as to extend along the extension direction of the guide rails 21a and 21b. One set of tips of the landing rails 42 on one end side (the side of the guide rails 21a and 21b) are provided so that the space therebetween increases toward the guide rails 21a and 21b. The landing means 32 is provided so as to guide the suspension portion 41 of the flying object 31 guided to the sides of the other set of tips of the guide rails 21a and 21b between the landing rails 42. The landing means 32 is configured so that the flying object 31 can be suspended and landed at a predetermined position of the landing rails 42 with the suspension portion 41 inserted between the landing rails 42.

In a specific example, the guide rails 21a and 21b and the landing rails 42 are arranged at intervals in the horizontal direction, but may be arranged at intervals in the vertical direction or the like without being limited to the horizontal direction. The guide rails 21a and 21b and the landing rails 42 may be installed in any place as long as a space can be provided at least on the lower side and in the extension direction on one end side of the guide rails 21a and 21b. The guide rails 21a and 21b and the landing rails 42 may be installed on the ceiling or under the eaves of a factory, a house, a building, or the like, or may be suspended by a crane or the like.

Next, the effects will be described.

Figure 7:
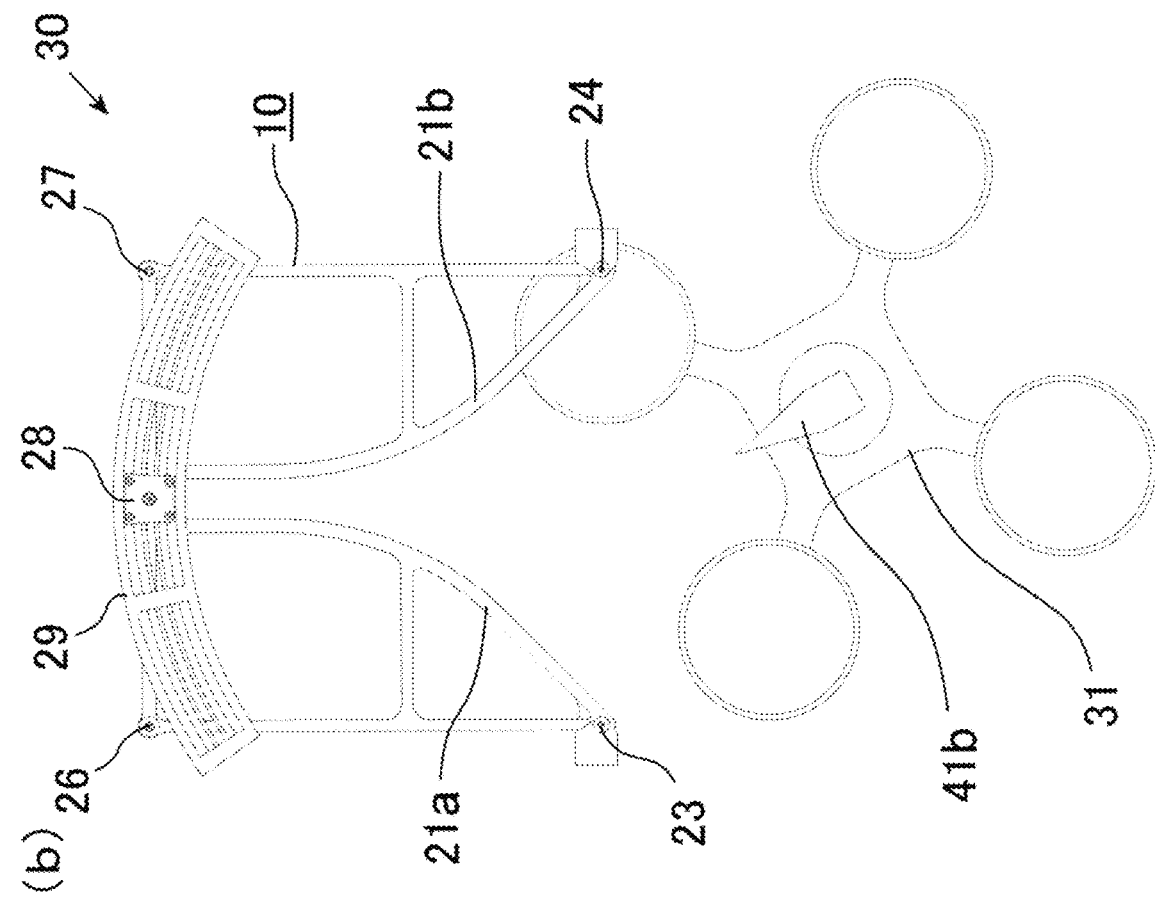
FIG. 7 includes (a) a perspective view and (b) a plan view showing a state in which a flying object flies toward the guide rails of the flying object landing system according to the embodiment of the present invention.
Figure 7:
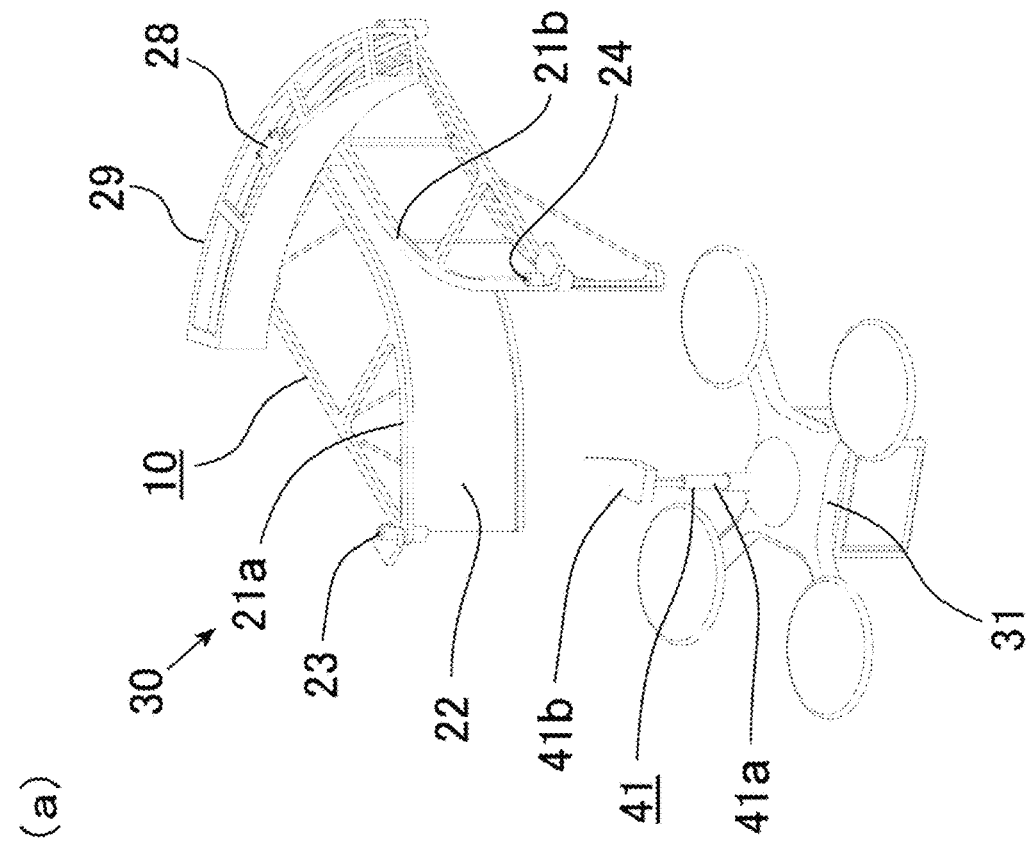
Figure 8:
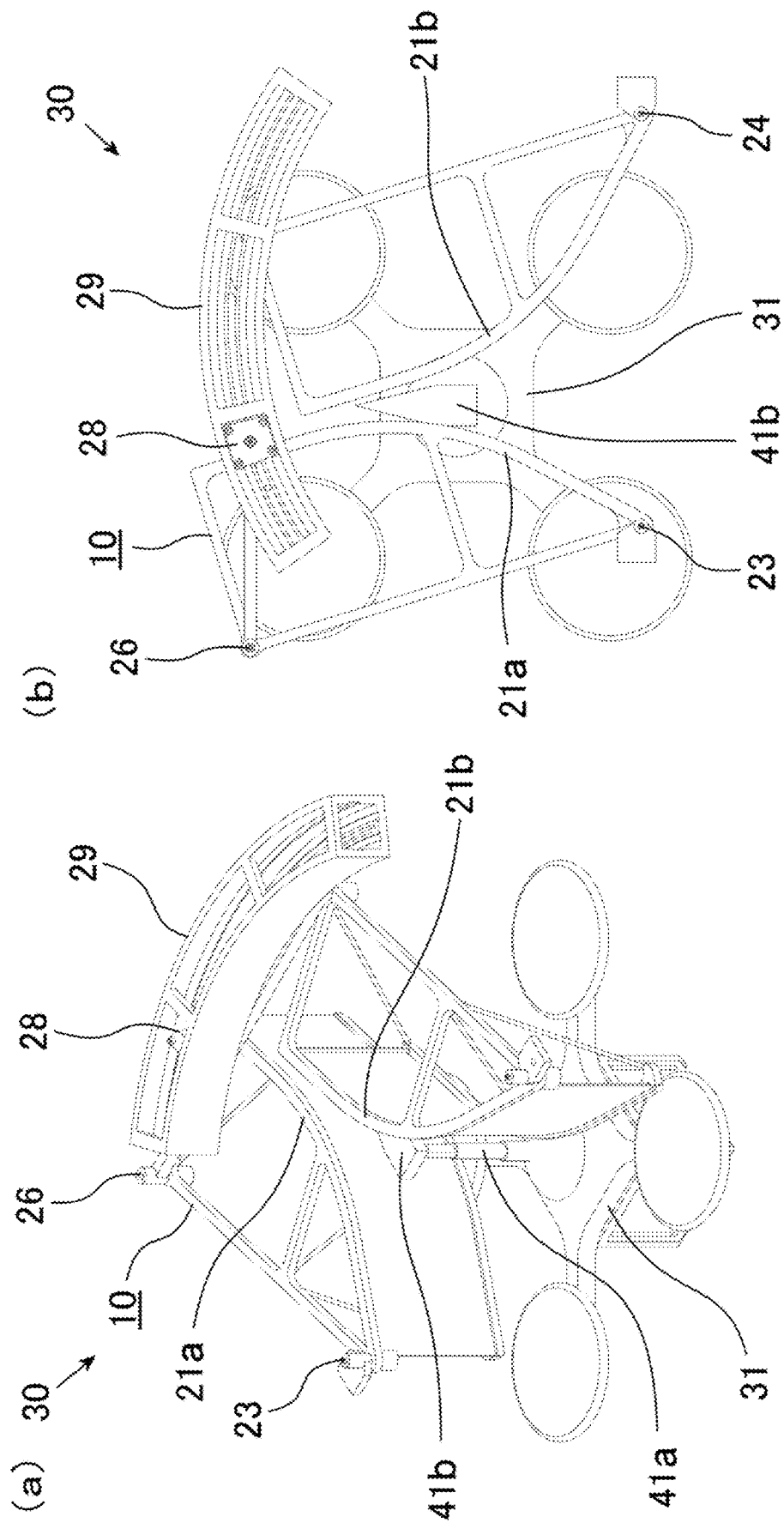
FIG. 8 includes (a) a perspective view and (b) a plan view showing a state in which a flying object is inserted between the guide rails of the flying object landing system according to the embodiment of the present invention.
Figure 9:
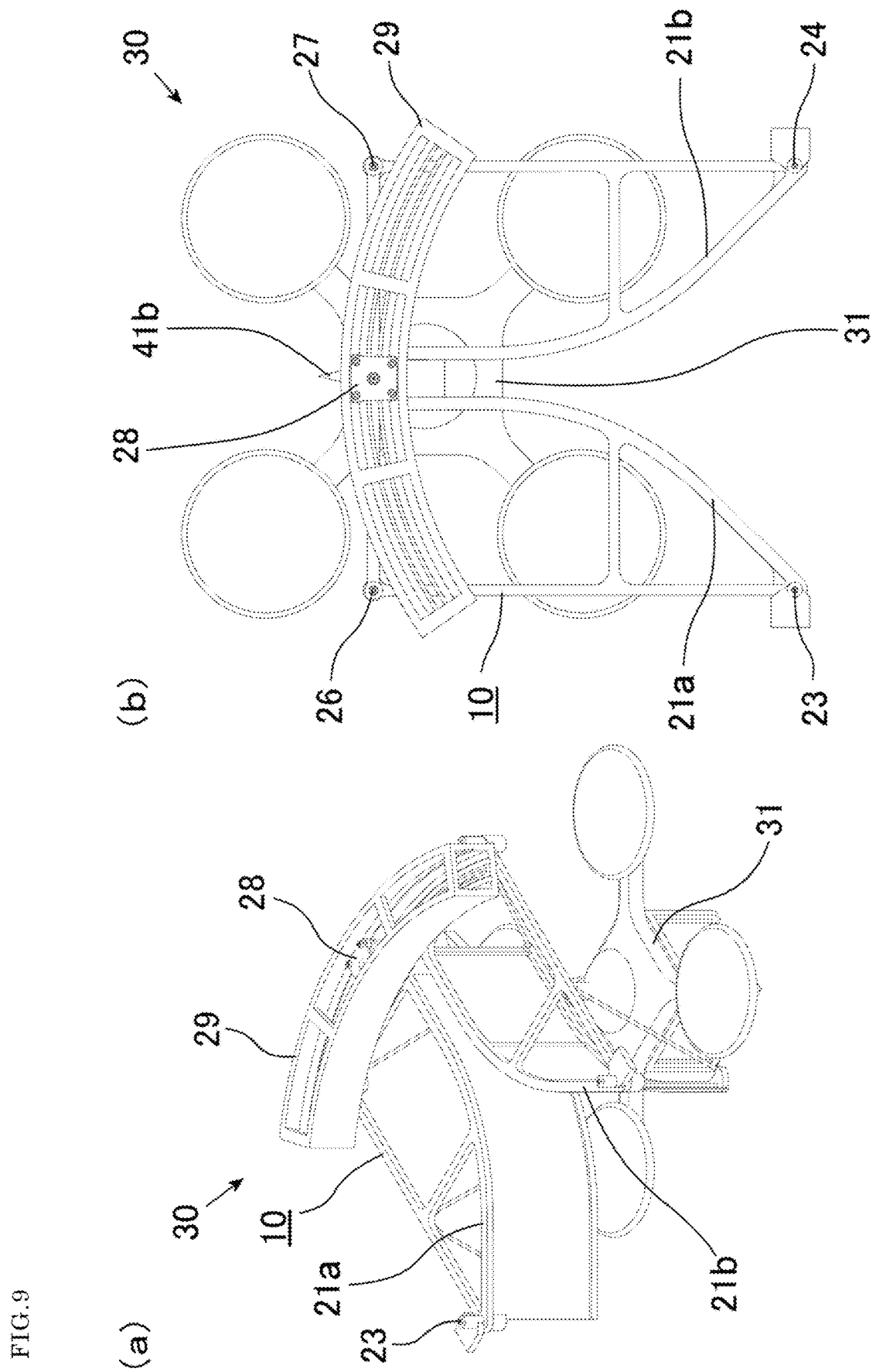
FIG. 9 includes (a) a perspective view and (b) a plan view showing a state in which a flying object is guided to the sides of the other set of tips of the guide rails of the flying object landing system according to the embodiment of the present invention.

The flying object landing system 30 can land the flying object 31 as follows. That is, as shown in FIG. 7, the flying object 31 is made to fly from the sides of one set of tips of the guide rails 21a and 21b toward the lower sides of the guide rails 21a and 21b, and as shown in FIG. 8, the suspension portion 41 provided on the upper part of the flying object 31 is inserted between the guide rails 21a and 21b from the sides of one set of tips of the guide rails 21a and 21b. At this time, since the engagement portion 41b of the flying object 31 has a shape in which the tip is sharpened in the traveling direction, the flying object 31 can be easily inserted between the guide rails 21a and 21b. Further, as shown in FIG. 9, the passive guidance mechanism 10 gradually brings the suspension portion 41 of the flying object 31 to an intermediate position of each of the guide rails 21a and 21b while colliding with the guide rails 21a and 21b. In this way, the flying object 31 can be smoothly guided to the sides of the other set of tips of the guide rails 21a and 21b.

The flying object landing system 30 can guide the suspension 41 of the flying object 31 guided from between the guide rails 21a and 21b to the sides of the other set of tips of the guide rails 21a and 21b between the landing rails 42, and the landing means 32 can land the flying object 31. In the flying object landing system 30, the flying object 31 can be easily moved to the landing position along the landing rails 42 by only the urging force of the flying object 31 when the suspension portion 41 of the flying object 31 is inserted between the landing rails 42, or by applying force from the sides of one set of ends of the landing rails 42 toward the other set of ends to the flying object 31. Therefore, after the suspension portion 41 is inserted between the landing rails 42, fine flight control is not required, and in some cases, it is possible to stop the propulsion means such as the propeller of the flying object 31.

In the flying object landing system 30, the influence of the ground effect can be made almost negligible by arranging the guide rails 21a and 21b and the landing rails 42 so that a sufficient space is provided under the flying object 31. In addition, since there is almost no influence of the ground effect, the flying object 31 can land stably even in a relatively narrow space.

The flying object landing system 30 can be suitably used when carrying luggage or the like attached to the lower part of the flying object 31. When the flying object 31 is suspended at the landing position, since there is a space under the flying object 31, it is easy to attach luggage to the lower part of the flying object 31 and to unload the luggage attached to the lower part of the flying object 31. At this time, for example, by installing a belt conveyor under the flying object 31 suspended at the landing position, the luggage being unloaded from the flying objects 31 coming one after another can be conveyed by the belt conveyor, and the luggage being conveyed by the belt conveyor can be sequentially attached to the lower part of the flying object 31 and transported individually.

The landing position of the landing rails 42 may be a predetermined point, or may be a predetermined length range along the length direction of the landing rails 42. The flying object 31 does not necessarily have to stop at the landing position. Further, the landing rails 42 may be configured so that the flying object 31 can take off from the other set of ends on the side opposite to the guide rails 21a and 21b. In this case, the flying object 31 can smoothly take off by moving the flying object 31 from the suspended state at the landing position toward the sides of the other set of ends of the landing rails 42.

[Flying Object Entering Test]

Figure 10:
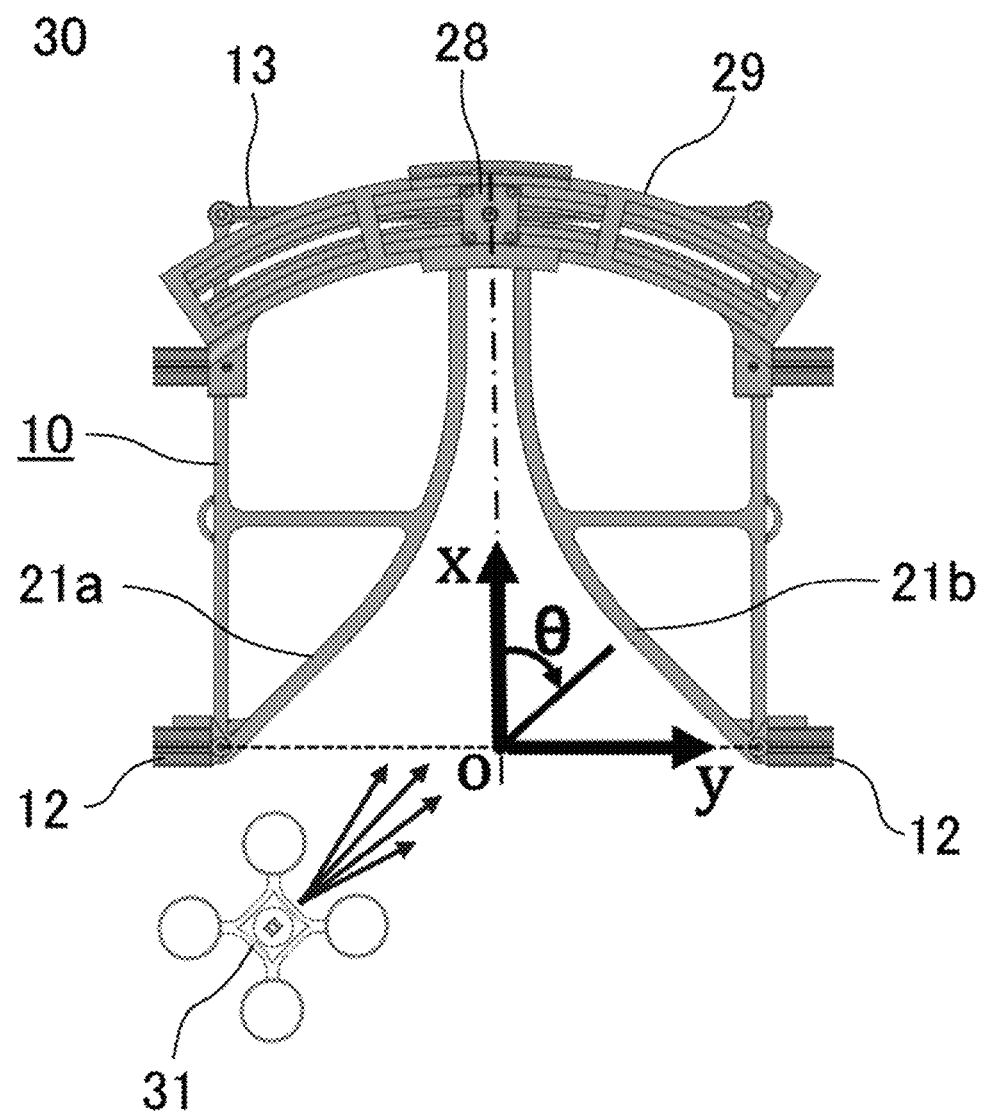
FIG. 10 is a plan view showing a test method for an entering test of a flying object in the flying object landing system according to the embodiment of the present invention.

Using the flying object landing system 30 shown in FIGS. 6 to 9, an entering test was conducted in which the flying object 31 was guided between the landing rails 42. In the test, as shown in FIG. 10, the flying object 31 was made to enter from the sides of one set of ends of the guide rails 21a and 21b 100 times at a random angle and velocity, and the trajectory was recorded by a motion capture system (trade name: "OptiTrack"). For comparison, an entering test was conducted in the same manner in a state where the guide rails 21a and 21b are fixed at the initial positions so that the first shaft 23, the second shaft 24, the third shaft 26, and the fourth shaft 27 do not rotate.

In the test, as the flying object 31, a drone ("Mavic Air" manufactured by DJI) having a suspension portion 41 having a 180 mm long arm 41a and an engagement portion 41b attached to the upper part was used. The drone is 168 mm in length, 184 mm in width, and 64 mm in height, and weighs 430 g, and the flying object 31 weighs 501.8 g. Further, as the passive guidance mechanism 10, a mechanism was used in which the guide rails 21a and 21b, the first reinforcing portion 25a, the second reinforcing portion 25b, the third reinforcing portion 25c, the connecting member 13, and the connecting support member 14 are manufactured by a 3D printer using acrylic resin and the surface member 22 is formed of a PET plate having a thickness of 1 mm. In the passive guidance mechanism 10, the opening width on the sides of one set of ends of the guide rails 21a and 21b is 270 mm, the opening width on the sides of the other set of ends is 30 mm, the range of the tapered portion from one set of ends of the guide rails 21a and 21b is 120 mm, the range (depth) from one set of ends of the guide rails 21a and 21b to the other set of ends is 280 mm, the width of the surface member 22 is 112 mm, the opening angle at one set of ends of the guide rails 21a and 21b is 45°, and the weight of each of the rail members 11 is 120 g.

Figure 11:
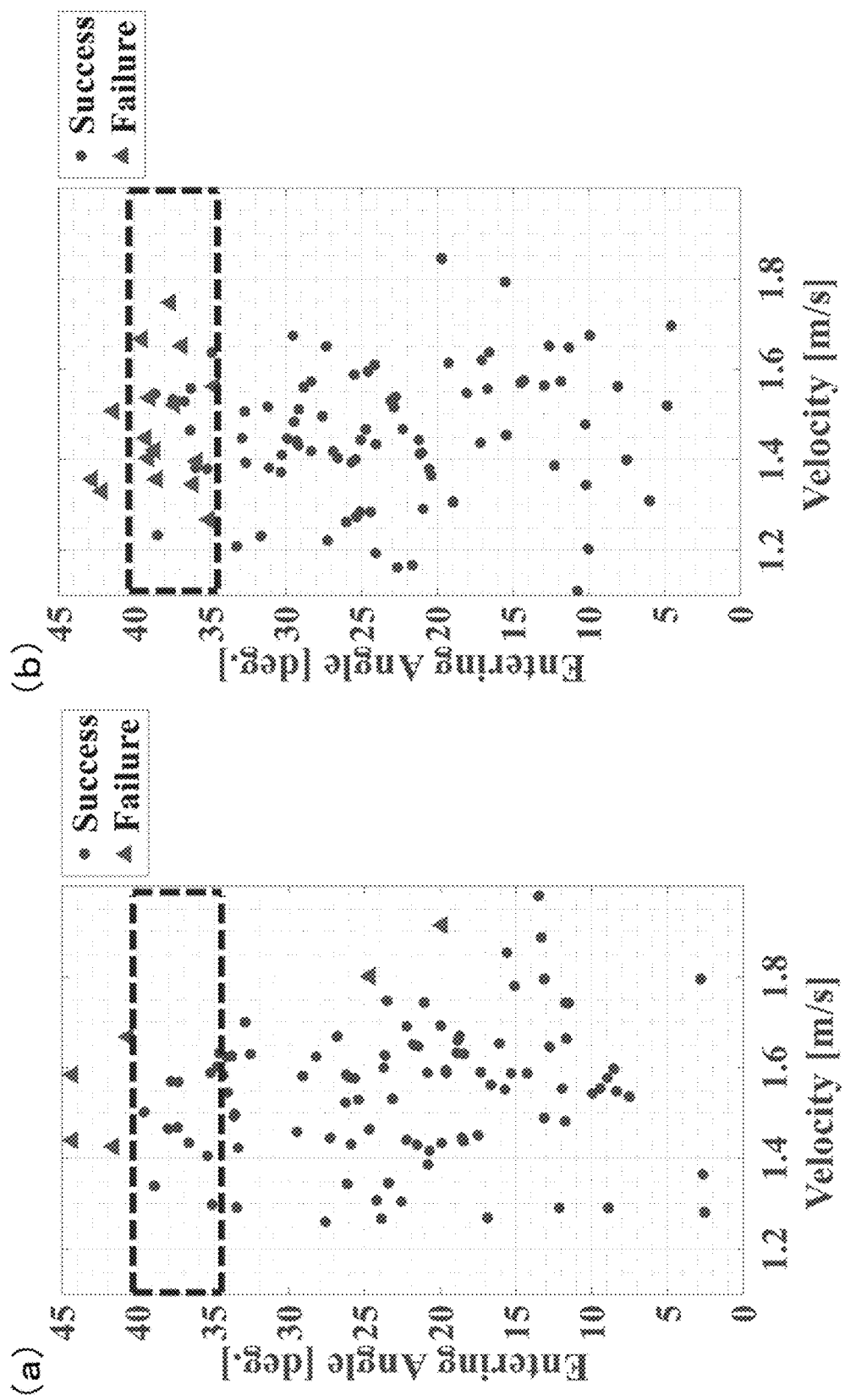
FIG. 11 is a graph showing a relationship between an entering velocity, an entering angle θ, and success or failure of entering in the flying object entering test shown in FIG. 10, of (a) the flying object landing system of the embodiment of the present invention and (b) a comparative example in which guide rails do not rotate.

The relationship between the entering velocity of the flying object 31, the entering angle θ shown in FIG. 10 and the success or failure of the entering is obtained and shown in FIG. 11. It was confirmed that as shown in FIG. 11(b), in the comparative example in which the guide rails 21a and 21b do not rotate, the entering success rate greatly decreases in the range of 35°<θ<40°, whereas as shown in FIG. 11(a), the entering success rate was very high in the example using the passive guidance mechanism 10. It was confirmed that both the example using the passive guidance mechanism 10 and the comparative example had a very high entering success rate up to the entering angle θ of 35°, and almost no difference was observed.

Figure 12:
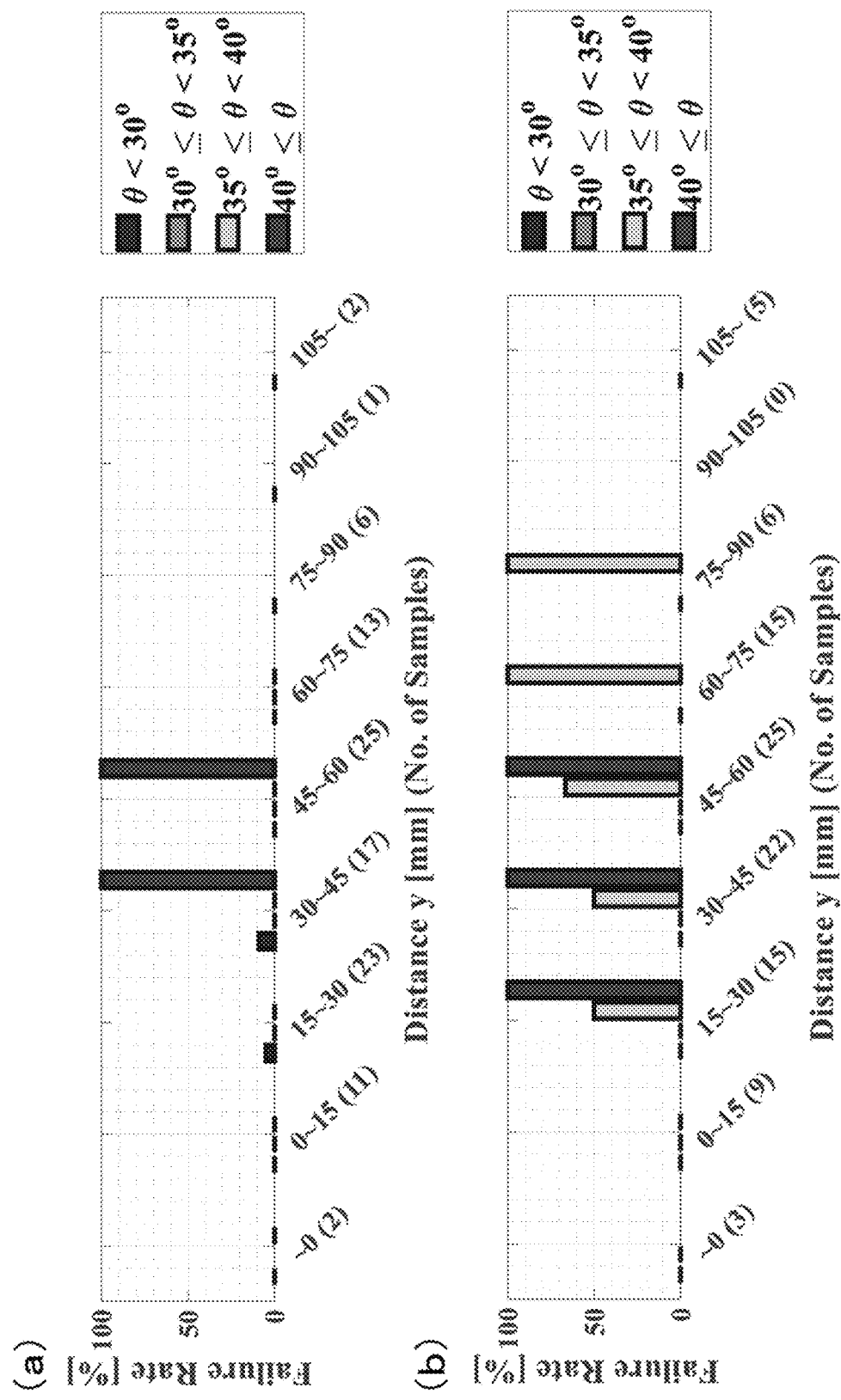
FIG. 12 is a graph showing a relationship between a collision position y, an entering angle θ, and a failure rate of entering in the flying object entering test shown in FIG. 10, of (a) the flying object landing system of the embodiment of the present invention and (b) a comparative example in which guide rails do not rotate.

Next, the relationship between the collision position y (distance from the center line of the opening at the initial position to the collision position with the guide rails 21a and 21b) shown in FIG. 10, the entering angle θ, and the failure rate of the entering is shown in FIG. 12. It can be confirmed that as shown in FIG. 12(b), in the comparative example, in the range of the collision position y of 15 mm to 60 mm, the failure rate was 100% when the entering angle θ was 40° or more, and the failure rate was 50% or more when the entering angle θ was 35° or more and less than 40°. It was also confirmed that in the range of the collision position y of 60 mm to 90 mm, the failure rate was 100% when the entering angle θ was 35° or more and less than 40°. In contrast, as shown in FIG. 12(a), it was confirmed that in the example using the passive guidance mechanism 10, in the range of the collision position y of 30 mm to 60 mm, the failure rate was 100% when the entering angle θ was 40° or more, whereas in the range of the collision position y of 15 mm to 90 mm, the failure rate was 0% when the entering angle θ was 35° or more and less than 40°, and the entering angle range of the flying object 3 was wide. Among the examples using the passive guidance mechanism 10 shown in FIG. 12(a), a failure example was observed when the collision position y was in the range of 15 mm to 45 mm and the entering angle θ was less than 30°. However, in these failure examples, the flying object 31 that collided with the guide rails 21a and 21b flew upward.

Figure 13:
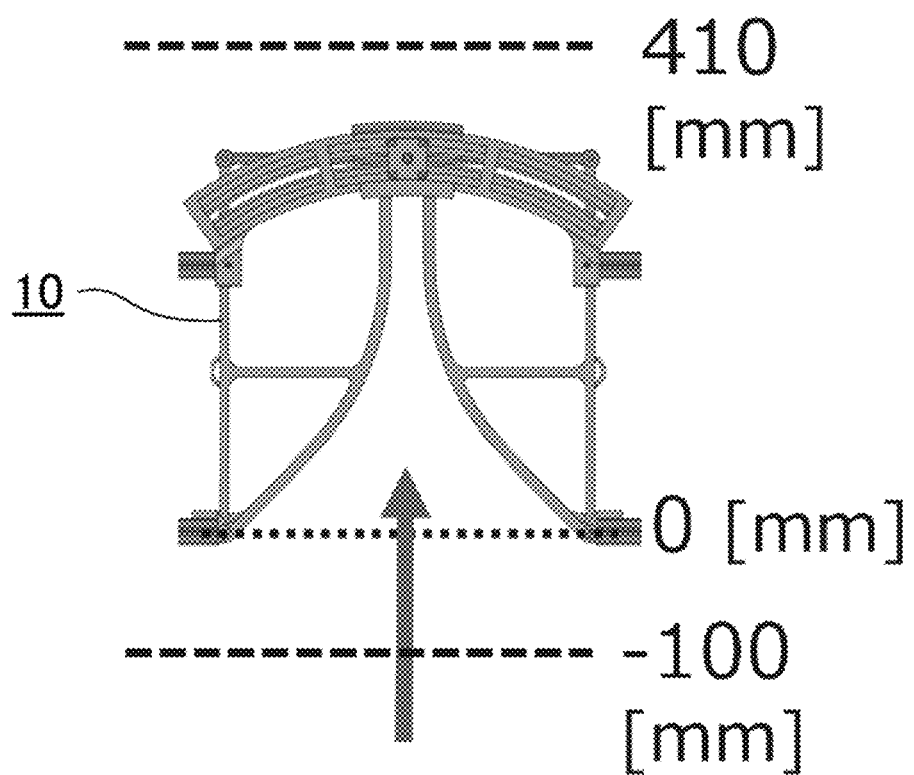
FIG. 13 is a plan view showing a method of measuring the entering time in the flying object entering test shown in FIG. 10.

Next, the entering time was measured. As shown in FIG. 13, the entering time was set to the time until the flying object passes through a position (the position where the flying object has left the sides of the other set of ends of the guide rails 21a and 21b) 410 mm from the opening on the sides of one set of ends of the guide rails 21a and 21b toward the sides of the other set of ends from the position 100 mm in front of the opening on the sides of one set of ends of the guide rails 21a and 21b. It was confirmed from the result of the measurement that the average entering time of those succeeded in entering was 0.65 seconds in the comparative example, whereas the average entering time of those succeeded in entering was 0.66 seconds in the examples using the passive guidance mechanism 10, and the entering time was almost the same. The average landing time (in 50 attempts) when the drone landed vertically on the ground from a height of 1.5 m was 4.94 seconds.

REFERENCE SIGNS LIST

10: Passive guidance mechanism
11: Rail member
21a, 21b: Guide rail
22: Surface member
23: First shaft
24: Second shaft
25a: First reinforcing portion
25b: Second reinforcing portion
25c: Third reinforcing portion
12: Rail support member
13: Connecting member
26: Third shaft
27: Fourth shaft
14: Connection support member
28: Slide member
29: Arc-shaped support portion
30: Flying object landing system
31: flying object
41: Suspension portion
41a: Arm
41b: Engagement portion
32: Landing means
42: Landing rail

What is claimed is:

1. A passive guidance mechanism comprising:
   a pair of guide rails arranged side by side with a space therebetween and provided so that the space increases toward one set of tips of the guide rails; and
   a connecting member connecting one guide rail and the other guide rail, wherein
   the one guide rail is supported so as to be rotatable about a first shaft extending in a direction perpendicular to a plane including the guide rails, at or near the tip thereof,
   the other guide rail is supported so as to be rotatable about a second shaft extending in a direction perpendicular to the plane including the guide rails, at or near the tip thereof,
   the connecting member has one end connected to the one guide rail so as to be rotatable about a third shaft perpendicular to the plane including the guide rails and has the other end connected to the other guide rail so as to be rotatable about a fourth shaft perpendicular to the plane including the guide rails, and
   the first shaft, the second shaft, the third shaft, and the fourth shaft form a four-node link mechanism composed of rotating pairs, and a line connecting the third shaft and the fourth shaft has the same length as and moves in parallel to a line connecting the first shaft and the second shaft.

2. The passive guidance mechanism according to claim 1, wherein
   the one guide rail and the other guide rail are provided so as to be rotatable in a forward direction and a reverse direction in a range of predetermined rotation angles about the first shaft and the second shaft, respectively, from an initial position where the guide rails are arranged symmetrically with respect to a predetermined plane.

3. The passive guidance mechanism according to claim 2, wherein
   the guide rails are configured to be urged toward the initial position.

4. The passive guidance mechanism according to claim 2, further comprising:
   a damper for absorbing a rotational force of the one guide rail and the rotational force of the other guide rail when the one guide rail rotates from the initial position to a side opposite to the other guide rail and when the other guide rail rotates from the initial position to a side opposite to the one guide rail.

5. The passive guidance mechanism according to claim 2, wherein
   the guide rails are connected to each other so that the rotation angle of the one guide rail about the first shaft from the initial position is equal to the rotation angle of the other guide rail about the second shaft from the initial position.

6. The passive guidance mechanism according to claim 1, wherein
   the connecting member is arranged at a predetermined distance in a vertical direction from the plane including the guide rails.

7. The passive guidance mechanism according to claim 1, further comprising:

a connection support member that supports the connecting member so as to be movable in relation to the guide rails.

8. A flying object landing system comprising:
a passive guidance mechanism comprising a pair of guide rails arranged side by side with a space therebetween and provided so that the space increases toward one set of tips of the guide rails, wherein one guide rail is supported so as to be rotatable about a first shaft extending in a direction perpendicular to a plane including the guide rails, at or near the tip thereof, and the other guide rail is supported so as to be rotatable about a second shaft extending in a direction perpendicular to the plane including the guide rails, at or near the tip thereof;
a flying object having a suspension portion provided on an upper part so as to be inserted between the guide rails from sides of the one set of tips of the guide rails; and
a landing means arranged on the sides of the other set of tips of the guide rails and provided so as to be able to land the flying object guided from sides of the one set of tips of the guide rails to the sides of the other set of tips through the suspension portion between the guide rails.

9. The flying object landing system according to claim 8, wherein
the landing means has a pair of landing rails, and is configured so that the suspension portion of the flying object guided to the sides of the other set of tips of the guide rails is guided between the landing rails and the flying object can be suspended at a predetermined position of the landing rails with the suspension portion inserted between the landing rails.

* * * * *